May 10, 1960
M. R. KINGERY
2,935,858
FISH BAIT CONTAINERS
Filed Aug. 9, 1957
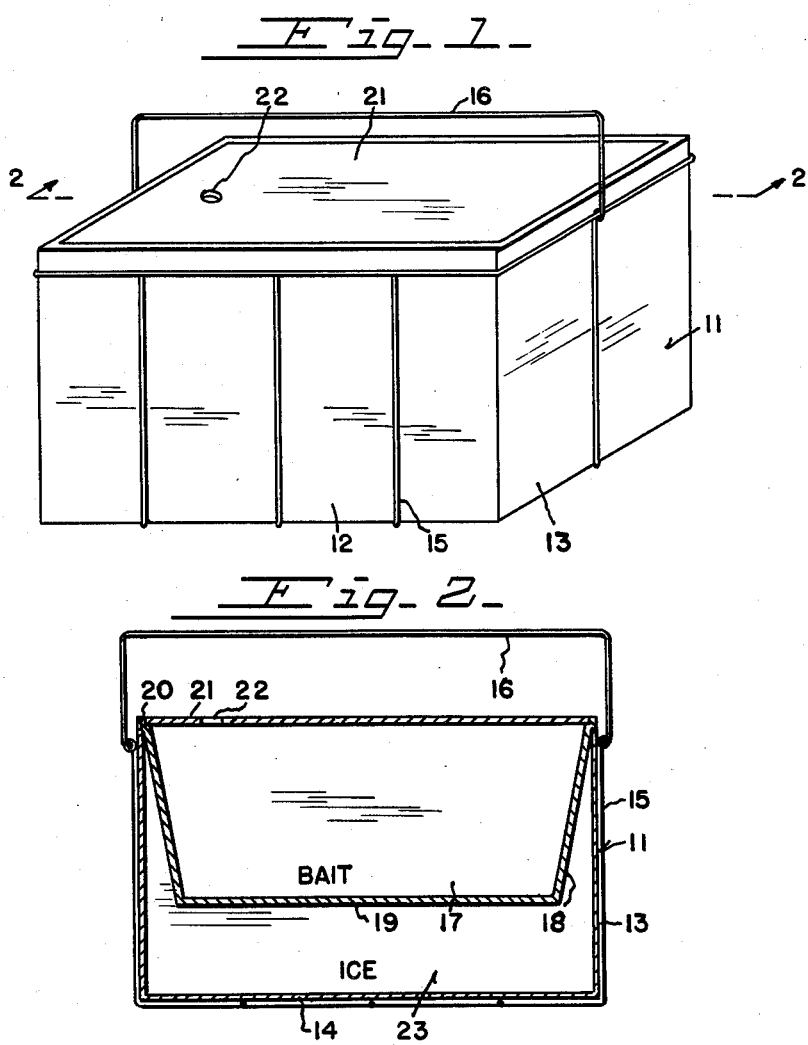
INVENTOR.
MARION R. KINGERY.
BY *H.C. Kavel.*
ATTORNEY.

United States Patent Office 2,935,858
Patented May 10, 1960

2,935,858
FISH BAIT CONTAINERS
Marion R. Kingery, Cincinnati, Ohio
Application August 9, 1957, Serial No. 677,375
1 Claim. (Cl. 62—371)

This invention relates to a fish bait container and more particularly to a double container, wherein ice can be packed in the lower container and the bait confined in the upper container which is of a semi-porous construction to permit the melting ice to draw the heat from the bait container to maintain the live bait in a fresh, healthy condition for long periods of time.

The object of my invention is to provide a container supporting a second container therein and provided with a handle and cover.

A further object is to form the inner container of a material susceptible to the cooling effect of ice in the lower container.

Further objects reside in the novel construction of parts.

My invention will be further readily understood from the following description and claim, and from the drawings, in which latter:

Fig. 1 is a perspective view of my improved container.

Fig. 2 is a sectional view of the same, taken in the plane of the line 2—2 of Fig. 1.

My improved fish bait container comprises a rectangular container 11 having side walls 12, end walls 13 and a bottom 14. This container may be made of extremely light material and I provide a wire frame 15 to support the container. A handle 16 is pivoted to the wire frame for ease in carrying the same.

A bait box 17 having tapered end and side walls 18 and a bottom 19 has a flange 20 extending from the upper edge arranged to rest on the top of the container 11. A lid 21, having a finger hole 22, fits the top of the bait box 17.

The box 17 is of less depth than the container 11 to provide a space 23 for the reception of ice. I prefer to use a somewhat porous material such as papier-mache for the bait box.

The user of the bait container puts his live bait such as worms, frogs, etc. in suitable moss or other material in the box 17 and ice in the container 11. As the ice melts the heat is drawn from the box 17 and maintains the bait in a fresh, healthy condition for long periods of time.

Having thus fully described my invention, what I claim as new and desire to secure by Letters Patent is:

A fish bait container comprising a container, ice in said container, a second container composed of a porous material having tapered end and side walls and supported on the upper edge of said first named container, the bottom of said second named container spaced from the bottom of said first named container whereby said second container has free space between the ends, side walls and bottom in respect to the first named container to permit heat from within said second named container to be withdrawn by ice in said first named container, a cover for said second named container, a supporting frame for said first named container, and a pivoted handle attached to said supporting frame.

References Cited in the file of this patent
UNITED STATES PATENTS

| | | |
|---|---|---|
| 763,437 | Sobey | June 28, 1904 |
| 1,419,549 | Fearnow | June 13, 1922 |
| 1,843,563 | Knoernschild | Feb. 2, 1932 |
| 1,883,135 | Walker et al. | Oct. 18, 1932 |
| 1,942,756 | Howard | Jan. 9, 1934 |
| 2,216,202 | Lake | Oct. 1, 1940 |
| 2,631,402 | Lastofka | Mar. 17, 1953 |
| 2,732,119 | Risch | Jan. 24, 1956 |

FOREIGN PATENTS

| | | |
|---|---|---|
| 449,656 | Great Britain | July 1, 1936 |
| 736,097 | France | 1932 |